(No Model.)
E. J. MALLETT, Jr.
Urinal Mat.
No. 229,436. Patented June 29, 1880.
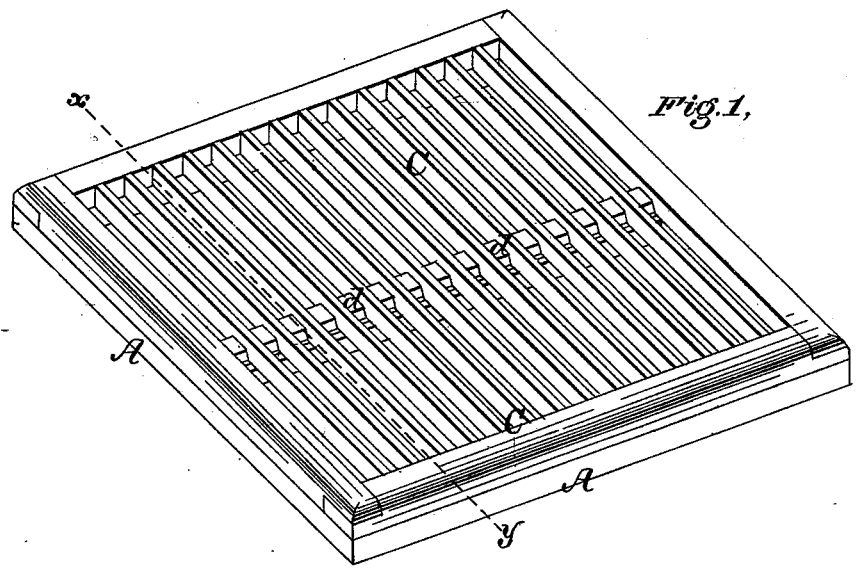
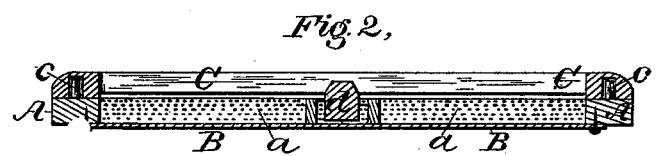
WITNESSES.
INVENTOR
Edward J. Mallett, jr,
by
his ATTORNEY.

UNITED STATES PATENT OFFICE.

EDWARD J. MALLETT, JR., OF NEW YORK, N. Y.

URINAL-MAT.

SPECIFICATION forming part of Letters Patent No. 229,436, dated June 29, 1880.

Application filed April 14, 1880. (No model.)

*To all whom it may concern:*

Be it known that I, EDWARD J. MALLETT, Jr., of the city, county, and State of New York, have invented certain new and useful Improvements in Urinal-Mats, of which the following is a specification.

My invention is directed to means for catching and deodorizing and disinfecting the drippings of urine which, when the ordinary urinal is used, are apt to fall on the floor.

I use for the purpose a layer of absorbent substance impregnated with a proper disinfectant, which is placed in suitable proximity to the urinal, and is covered by a grating or other reticulated or open-work cover, on which the person using the urinal stands, said grating or cover being removable, so as to permit the absorbent layer beneath to be renewed at proper intervals.

The manner in which my invention is or may be carried into effect will be understood by reference to the accompanying drawings, in which I have represented the form of mat which thus far I have found best adapted for my purposes.

Figure 1 is a perspective view of the mat. Fig. 2 is a section through the same on line *x y*, Fig. 1.

The body of the mat is composed of a rectangular frame, A, preferably of wood, closed at the bottom by a sheet of metal, B, preferably tin or galvanized iron, the whole forming a pan or tray of sufficient depth to hold the necessary quantity of absorbent material impregnated with a disinfectant. The material which I prefer to use for the purpose is cedarwood sawdust impregnated with a solution of chloride of zinc. I find it advantageous to add to the chloride of zinc Glauber salts. The latter, being an efflorescent salt, is added in such quantity to the former, which is a deliquescent salt, that when the sawdust is impregnated with the mixture and dried it will not thereafter be liable to become moist by absorbing moisture from the atmosphere, but it will remain dry.

By thus overcoming or neutralizing the deliquescent properties of the mixture by adding an efflorescent salt the chloride does not, by absorbing moisture from the atmosphere, lessen the absorptive properties of the sawdust. The latter, after being impregnated with the disinfecting solution, is thoroughly dried in kilns or otherwise, and is then ready for use.

The pan is filled to the proper extent with the impregnated sawdust, which is shown in the drawings at *a*, and the said material is covered by a grating, C, or other reticulated or open-work cover, which, when in place, rests on the frame A, and is connected therewith by suitable means to prevent lateral movement of the one with respect to the other.

The means shown in the drawings consist of dowels *c* on the frame, which enter sockets in the cover; and for further security the cross-bar *d*, which supports centrally the slats of the grating, enters recesses in the frame A. The cover, however, is removable, in order to permit access to be had to the pan and to allow the sawdust to be at proper intervals removed and replaced by fresh material.

I prefer to use sawdust as the absorbent material, because it is not only effective but extremely cheap.

The material in the pan can be thrown away every time the mat has absorbed a certain quantity of urine, and it is usually renewed two or three times a month.

It is manifest, however, that other absorbent material can be used—such, for instance, as a felt pad. I can also make use of other disinfectants with which to impregnate the absorbent material; nor is it absolutely essential that the movable pan should be employed.

The sawdust or other absorbent can be spread upon any proper surface, forming a layer upon which the cover or grating may rest, or above which said grating may be positioned.

I do not restrict myself, therefore, to the details herein shown and described in illustration of my invention; but

What I claim, and desire to secure by Letters Patent, is—

1. A urinal-mat comprising a layer or body of absorbent material impregnated with a disinfectant and a superposed open-work cover or grating, substantially as hereinbefore set forth.

2. The combination of the pan, the absorbent disinfecting material contained in said pan, and the removable open-work cover or grating, substantially as hereinbefore set forth.

In testimony whereof I have hereunto set my hand this 12th day of April, A. D. 1880.

EDWARD J. MALLETT, JR.

Witnesses:
E. A. DICK,
M. GEORGII.